United States Patent
Kalevo et al.

(10) Patent No.: US 8,675,731 B2
(45) Date of Patent: Mar. 18, 2014

(54) ENCODER AND METHOD

(75) Inventors: Ossi Kalevo, Toijala (FI); Tuomas Kärkkäinen, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

(21) Appl. No.: 13/584,005

(22) Filed: Aug. 13, 2012

(65) Prior Publication Data

US 2014/0044190 A1 Feb. 13, 2014

(51) Int. Cl.
*H04N 7/12* (2006.01)
*H04N 11/02* (2006.01)
*H04N 11/04* (2006.01)

(52) U.S. Cl.
USPC ........... 375/240.02; 375/240.18; 375/240.24; 382/239; 382/248; 348/395.1; 348/403.1; 348/404.1; 348/420.1

(58) Field of Classification Search
USPC ............... 375/240.01–240.29; 382/232–253, 382/400.1–440.1; 348/400.1–440.1, 348/84.1–399.1
See application file for complete search history.

(56) References Cited

U.S. PATENT DOCUMENTS

| | | | |
|---|---|---|---|
| 5,832,130 A | 11/1998 | Kim | |
| 6,529,634 B1 | 3/2003 | Thyagarajan et al. | |
| 7,379,496 B2 | 5/2008 | Holcomb et al. | |
| 7,676,101 B2 | 3/2010 | Sato et al. | |
| 7,995,849 B2 * | 8/2011 | Raveendran et al. | 382/248 |
| 8,018,994 B2 * | 9/2011 | Tong et al. | 375/240 |
| 8,270,738 B2 * | 9/2012 | Raveendran et al. | 382/236 |
| 2006/0204115 A1* | 9/2006 | Burazerovic | 382/239 |
| 2012/0027083 A1* | 2/2012 | Narroschke et al. | 375/240.03 |

FOREIGN PATENT DOCUMENTS

| | | |
|---|---|---|
| GB | 2 274 754 A | 8/1994 |
| WO | 2010/087807 A1 | 8/2010 |

OTHER PUBLICATIONS

Search Report under Section 17 dated Oct. 26, 2012 issued by the U.K. Patent Office in related U.K. Application No. GB 1214414.3 (4 pages).
Bumshik Lee et al., "A Hierarchical variable-sized block transform coding scheme for coding efficiency improvement on H.264/AVC", 2010 Picture Coding Symposium (PCS 2010); Nagoya, Japan, Dec. 8-10, IEEE, Piscataway, NJ, pp. 522-525.
European Search and Examination Repor mailed Nov. 20, 2013 issued in related European application No. 13002521.6-1908 (8 pages).

\* cited by examiner

*Primary Examiner* — Sath V Perungavoor
*Assistant Examiner* — Nathnael Aynalem
(74) *Attorney, Agent, or Firm* — Robert P. Michal; Lucas & Mercanti, LLP

(57) ABSTRACT

An encoder is operable to encode input data to generate corresponding encoded output data. The encoder includes data processing hardware. The encoder compresses content associated with blocks or packets, so that the encoded output data is smaller in size than the input data.

27 Claims, 6 Drawing Sheets

ENCODER AND METHOD

CROSS REFERENCE TO RELATED APPLICATION

This application claims priority from U.K. Application Serial No. GB 1214414.3 filed Aug. 13, 2012, the entire contents of which is incorporated herein by reference.

FIELD OF THE INVENTION

The present invention relates to encoders for receiving input data and encoding the input data to generate corresponding encoded output data. Moreover, the present invention also concerns methods of encoding input data to generate corresponding encoded output data. Furthermore, the present invention also concerns software products recorded on machine-readable data storage media, wherein the software products are executable upon computing hardware for implementing aforesaid methods.

BACKGROUND OF THE INVENTION

Images and videos are stored and communicated to an increasing extent by contemporary human population, for example multimedia content via Internet and wireless communication networks. The images and videos are stored and communicated between devices, software applications, media systems and data services. During such storage and communication, images and video are captured scanned, transmitted, shared, watched and printed. However, such images and videos are demanding in respect of data memory capacity and communication system bandwidth utilized. When communication system bandwidth is limited, such images and videos take significant time to communicate. For addressing such storage requirements, it has been customary practice to employ image and video encoding methods which also provide a degree of data compression. Some contemporary encoding standards for images and video are provided in Table 1.

TABLE 1

| contemporary encoding standards | | | | |
|---|---|---|---|---|
| JPEG | MPEG-1 | H.261 | WebP | Lucid |
| JPEG2000 | MPEG-2 | H.263 | WebM | GIF |
| JPEG XR | MPEG-4 | H.264 | | PNG |
| | MPEG-4 AVC | | | TIFF |
| | MPEG-4 MVC | | | BMP |
| | MP3 | | | VC-1 |
| | | | | Theora |
| | | | | AAC |
| | | | | FLAC |
| | | | | Ogg Vorbis |
| | | | | Speex |

Image and audio files are becoming larger as image quality is progressively improved, for example by adoption of high definition (HD) standards and high dynamic range (HDR). However, 3-dimensional (3-D) images, videos and audio are gaining increasing popularity which demands correspondingly more efficient encoding and decoding methods in encoders and decoders, namely "codecs", to cope with associated increased quantities of data to be communicated and stored. However, it is highly desirable that encoding methods that provide a degree of data compression should be substantially lossless in relation to information content when generating the compressed data.

Conventional codecs are described in earlier published patent applications and granted patents, for example as in U.S. Pat. No. 5,832,130, U.S. Pat. No. 7,379,496 and U.S. Pat. No. 7,676,101. In general, known video codecs are not able to code efficiently extensive areas of images with substantially constant parameters whilst concurrently being able to encode highly spatially detailed areas of the images. It is customary practice to employ motion compensation in a form of prediction and prediction error coding methods based upon use of transformations, for example discrete cosine transform (DCT) and wavelet transformations. These transformations employ a process wherein portions of a given image, for example a still image or an image forming a part of a video sequence, are divided into blocks which are then subject to encoding processes. The blocks are, for example, 8×8 image elements, 4×4 image elements or similar. Such relatively smaller blocks are employed because larger sizes of blocks result in inefficient encoding processes, although 16×16 image element blocks are sometimes employed. According to contemporary known approaches to image encoding, when multiple different block sizes are used for encoding, it is customary practice to utilize a small variation in block sizes; moreover, block sizes are selected based upon how well movement can be compensated in an associated block area or based upon a encoding quality parameter, for example a target quality parameter. In general, higher encoded image quality requires smaller blocks which results in less data compression. Certain types of contemporary encoding can even results in an increase in data size, when error correction features such as parity codes and error correction codes are included.

From the foregoing, it will be appreciated that providing data compression of images and videos whilst preserving image quality is a contemporary problem which is not adequately addressed by known encoders and decoders, despite a large variety of codecs having been developed during recent decades.

SUMMARY OF THE INVENTION

The present invention seeks to provide an encoder for encoding input data representative of at least one image and generating corresponding encoded output data representative of the at least one image, wherein the encoded output data is compressed in relation to the input data without any substantial loss of image quality occurring during encoding.

The present invention also seeks to provide a method of encoding input data representative of at least one image and generating corresponding encoded output data representative of the at least one image, wherein the encoded output data is compressed in relation to the input data without any substantial loss of image quality occurring during encoding.

According to a first aspect of the present invention, there is provided a method of encoding input data to generate corresponding encoded output data as defined in appended claim 1: there is provided a method of encoding input data to generate corresponding encoded output data, characterized in that the method includes steps of:

(a) sub-dividing the input data into a plurality of blocks or packets, the blocks or packets having a size depending upon a nature of their content, and the blocks or packets being of one or more sizes;

(b) applying at least one transformation to content of the blocks or packets to generate corresponding transformed data;

(c) checking a quality of representation of the transformed data of the blocks or packets compared to the content of the blocks or packets prior to application of the at least one transformation to determine whether or not the quality of representation of the transformed data satisfies one or more quality criteria;

(d) in an event that the quality of representation of the transformed data of the one or more blocks or packets does not satisfy the one or more quality criteria, sub-dividing the one or more blocks or packets further and repeating step (b); and (e) in an event that the quality of representation of the transformed data of the one or more blocks or packets satisfies the one or more quality criteria, outputting the transformed data to provide encoded output data representative of the input data to be encoded.

The invention is of advantage in that the method is capable of providing efficient encoding of the input data to provide the corresponding encoded output data whilst potentially providing substantially lossless data compression of the encoded output data relative to the input data to be encoded.

Optionally, the method includes using the at least one transformation to compress content associated with the blocks or packets, so that the encoded output data is smaller in size than the input data to be encoded.

Optionally, the method includes selecting between different types of transformation for ensuring that the one or more quality criteria are satisfied.

Optionally, the method includes arranging for the one or more quality criteria to be dynamically variable during encoding of the blocks or packets depending upon a nature of content included within the blocks or packets.

Optionally, the method is implemented such that the blocks or packets are sub-divided so that at least one of their representative parameters describing their content is flat within their sub-divided blocks or packets. The at least one representative parameter is, for example, colour.

Optionally, the method is implemented such that the blocks or packets correspond to a series of images, wherein sub-division of the input data corresponding to a given image to form the plurality of corresponding blocks is made dependent upon content present in one or more images preceding the given image within the temporal sequence of images.

Optionally, the method includes adding header information to the transformed data in step (e) to generate the encoded output data, wherein the header information includes information indicative of the at least one transformation employed in step (b).

Optionally, the method is implemented such that step (b) includes fetching supplementary information from a database arrangement for use when executing the at least one transformation, the supplementary information including at least one of: algorithms, rules, one or more transformation parameters. More optionally, the method further includes adding header information to the encoded output data indicative of the database arrangement for enabling subsequent decoding of the encoded output data to access the supplementary information when decoding the encoded output data.

Optionally, the method includes employing for the at least one transformation one of more of: data base reference, DC-value, DCT, pulse code modulation (PCM), DPCM, RLE, LZO, VLC, Huffman-coding, arithmetic coding, transform coding, delta coding, bzip2-specific RLE. Other types of transformation are also feasible to employ for the method.

Optionally, the method includes encoding at least one of video and audio information present in the input data.

Optionally, the method includes encoding multiple channels and/or layers in the encoded output data for providing at least one of: interactive video, commercial advertisements, a plurality of viewpoints during sports event reporting, interactive watermarks, interactive pattern recognition, animated 2D/3D user interface buttons.

According to a second aspect of the invention, there is provided a software product recorded on machine-readable data storage media, wherein the software product is executable upon computing hardware for executing a method pursuant to the first aspect of the invention.

According to a third aspect of the invention, there is provided a software application for a mobile wireless communication device, wherein the software application includes a software product pursuant to the second aspect of the invention.

According to a fourth aspect of the invention, there is provided an encoder operable to encode input data to generate corresponding encoded output data, characterized in that the encoder includes data processing hardware which is operable:

(a) to sub-divide the input data into a plurality of blocks or packets, the blocks or packets having a size depending upon a nature of their content, and the blocks or packets being of one or more sizes;

(b) to apply at least one transformation to content of the blocks or packets to generate corresponding transformed data;

(c) to check a quality of representation of the transformed data of the blocks or packets compared to the content of the blocks or packets prior to application of the at least one transformation to determine whether or not the quality of representation of the transformed data satisfies one or more quality criteria;

(d) in an event that the quality of representation of the transformed data of the one or more blocks or packets does not satisfy the one or more quality criteria, to sub-divide the one or more blocks or packets further and repeating step (b); and (e) in an event that the quality of representation of the transformed data of the one or more blocks or packets satisfies the one or more quality criteria, to output the transformed data to provide the encoded output data representative of the input data to be encoded.

Optionally, the encoder is implemented such that the data processing hardware is implemented using computing hardware operable to execute a software product. More optionally, the data processing hardware includes a plurality of processors which are operable to process data in parallel, and the encoder is operable to direct concurrently block and/or packet data to the plurality of processors for encoding to data to be included in the encoded output data.

Optionally, the encoder is operable to select between different types of transformation for ensuring that the one or more quality criteria are satisfied.

Optionally, the encoder is operable to use the at least one transformation to compress content associated with the blocks or packets, so that the encoded output data is smaller in size than the input data to be encoded.

Optionally, the encoder is operable to arrange for the one or more quality criteria to be dynamically variable during encoding of the blocks or packets depending upon a nature of content included within the blocks or packets.

Optionally, the encoder is operable to sub-divide the blocks or packets so that at least one of their representative parameters describing their content is flat within their sub-divided blocks or packets. More optionally, the encoder is implemented such that the at least one parameter corresponds to a colour of the sub-divided blocks.

Optionally, the encoder is implemented such that the blocks or packets correspond to a series of images, wherein sub-division of the input data corresponding to a given image to form the plurality of corresponding blocks is made dependent upon content present in one or more images preceding the given image within the temporal sequence of images.

Optionally, the encoder is operable to add header information to the transformed data to generate the encoded output data, wherein the header information includes information indicative of the at least one transformation employed by the encoder.

Optionally, the encoder is operable to fetch supplementary information from a database arrangement for use when executing the at least one transformation, the supplementary information including at least one of: algorithms, rules, one or more transformation parameters. More optionally, the encoder is operable to add header information to the encoded output data in a manner indicative of the database arrangement for enabling subsequent decoding of the encoded output data to access the supplementary information when decoding the encoded output data.

Optionally, the encoder is operable to employ for the at least one transformation one of more of: data base reference, DC-value, DCT, pulse code modulation (PCM), DPCM, RLE, LZO, VLC, Huffman-coding, arithmetic coding, transform coding. Other types of transformation are optionally employed by the encoder.

Optionally, the encoder is operable to encode at least one of video and audio information present in the input data to be encoded.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein.

Figure 1:
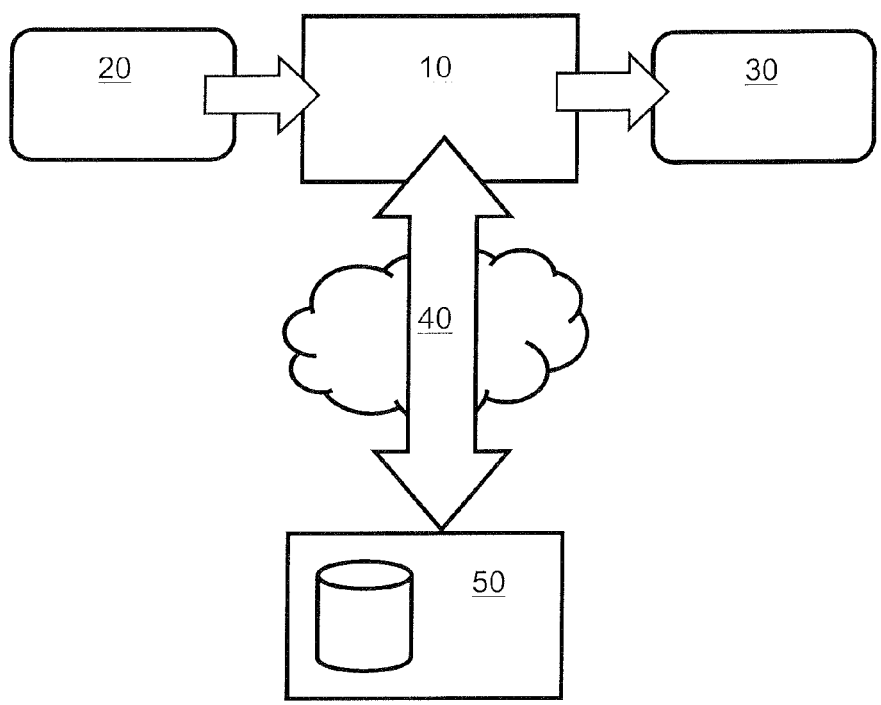
FIG. 1 is a schematic illustration of an embodiment of an encoder pursuant to the present invention.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In overview, the present invention is concerned with encoders and associated methods of encoding input data to generate corresponding encoded output data. The method is concerned with receiving input data representative of one or more images and/or one or more audio signals, and then processing the input data in a manner corresponding to partitioning each image into blocks which can be of variable size, and/or partitioning the one or more audio signals into packets which can be of variable size. Moreover, the method includes processing the blocks and/or packets to generate compressed encoded output data representative of the one or more images and/or the one or more audio signals.

Selection of the blocks is determined by an ease with which areas corresponding to the blocks can be encoded; for example, larger blocks are employed for areas of the one or more images which have a substantially constant associated parameter value, and smaller blocks are employed for areas of the one or more images which are difficult to encode on account of relatively abrupt spatial changes in associated parameter values for the areas. The parameters optionally pertain to one or more of: colour, illumination, sliding parameter value, repetitive pattern. Easy encoding corresponds, for example, to at least one parameter associated with a given area being substantially constant within the given area. Moreover, the method also employs larger blocks for stationary areas in video sequences of images, or to groups of areas in the video sequences of images that are moving similarly, namely blocks which correspond to fixed objects. The blocks are optionally rectilinear in relation to areas of the one or more images which they represent, for example 64×64 elements, 32×16 elements, 4×20 elements, 10×4 elements, 1×4 elements, 3×1 elements, 8×8 elements, 1×1 element and so forth; optionally, the elements correspond to pixels present in the one or more images, but can be subject to scaling operations during encoding, namely each element corresponding to a corresponding plurality of pixels. However, other shapes of blocks are optionally employed, for example elliptical blocks, circular blocks and so forth. Moreover, by analogy, the method can also be applied to encode one or more audio signals, wherein the one or more audio signals are subdivided into packets of variable temporal length, depending upon a nature of the audio signals corresponding thereto, and the packets are then encoded to generate encoded compressed output data; the packets are synonymous with aforesaid blocks but pertain to audio rather than images information.

Encoders pursuant to the present invention are capable of concurrently encoding both audio information and image information.

During processing of the areas of the one or more images into corresponding blocks, the method includes checking a quality of representation of information provided by the blocks relative to corresponding detail in the one or more images to compute a corresponding quality index; in an event that the computed quality index indicates, when compared against a reference quality threshold, that a selection of block sizes has been employed such that the quality of representation of data provided by the blocks is insufficient, the method iterates back and uses progressively smaller blocks until the quality index indicates that the quality of representation is met as defined by the reference quality threshold. By such an approach, it is feasible, pursuant to the present invention, to achieve data compression during encoding which is substantially lossless, depending upon choice of threshold value for the quality of representation of information. Optionally, the reference quality threshold is made dynamically variable, depending upon content present in the one or more images; for example, when the one or more images are a part of video sequence where there is rapid chaotic activity, the reference quality threshold can be relaxed during the chaotic activity for enabling an enhanced degree of data compression to be achieved. The chaotic activity can be, for example, random features such as flowing turbulent water, flames, falling snow, billowing smoke, ocean waves and so forth, wherein loss of information is not readily discernible when the encoded data is subsequently decoded in a decoder.

Determination of blocks in the aforesaid encoder can be optionally based upon one or more criteria as listed in Table 2.

TABLE 2

Split selection of blocks during image encoding

| Criterion number | Criterion |
|---|---|
| 1 | Variance or standard deviation of block data as derived from a corresponding area of an input image |
| 2 | Mean or sum of an absolute difference between data represented by a given block and a prediction of its value |
| 3 | Variance or standard deviation of an absolute difference between data represented by a given block and a prediction of its value |

Optionally, predictions in Table 2 are based upon known rules employed when encoding one or more images. Alternatively, the predictions in Table 2 are based upon provided configuration information, for example as provided from selected database references, from prediction directions, from movements of block coordinates within the one or more images, and so forth. A use of a variance or a standard deviation is an approach employed pursuant to the present invention to provide compression of information by describing a mutual relationship of elements included within a given corresponding block. In many situations, predictions of block data with associated encoding is itself sufficient when performing encoding pursuant to the present invention, but it is optionally desirable to include code prediction error data within the prediction to improve an accuracy of the prediction. In a simple embodiment of the present invention, a simple data prediction method is employed, for example a mean value, namely "DC" value, of pixels or elements within a given block to be delivered in the encoded output data.

Splitting areas of one or more images provided as input data to an encoder implementing the aforesaid method is optionally implemented according to any manner which provides both compression and also substantially maintains image quality, namely is substantially lossless during encoding. The method applies various strategies to such splitting of areas. For example, if a given block includes considerable information, it is optionally split into a plurality of corresponding smaller blocks that are relatively "flat", namely substantially constant, in relation to their content such that they individually include relatively little information. When the encoding method pursuant to the present invention is applied to at least one or more images and/or one or more audio signals, encoding quality and encoding noise in the encoded output data are optionally employed to control a manner in which splitting up of input images and audio input signals into blocks and packets respectively occurs. Optionally, the noise in the encoded output encoded data is based on at least one of:

(i) noise present in a present block or packet;
(ii) noise present in one or more previous blocks or packets generated by the method; and
(iii) previous images.

Optionally, when a given input image is split into areas and corresponding blocks, the method analyses the blocks thereby generated to determine whether or not any of the blocks can be combined together, subject to aforesaid quality criteria, in order to obtain a greater degree of data compression in the encoded output data. In the foregoing, the encoded output data includes information associated with the blocks which defines locations of their corresponding areas in their original images in the input data to be encoded.

When encoding the one or more images present in the input data to be encoded using the method, data associated with the input images is beneficially down-sampled, for example down-sampled in ratios of 2×1:1, 2×2:1, 1×2:1, 4×1:1, or similarly quantized prior to being subject to aforementioned encoding methods. Optionally, such down-sampling is performed in response to a desired quality of encoding desired in the compressed encoded output data generated from applying methods pursuant to the present invention. Optionally, larger blocks processed by the methods are less quantized than smaller blocks; in other words, a degree of quantization employed is optionally decreased as block sizes are increased. Optionally, during encoding, a scaling factor for down-sampling employed, is made dynamically variable, for example in response to a nature of content in a sequence of images, for example video, to be encoded.

During encoding of blocks pursuant to the method, each block has various parameters which describe its contents. These parameters are conveyed when encoding via various "channels". For example, colour channels describing blocks of an image can include one or more of: black/white (B/W), Y, U, V, red (R), green (G), blue (B), Cyan (C), Magenta (M), Y and K. Moreover, the input images for encoding and the blocks can be optionally processed when executing the methods using a variety of potential colour or pixels formats, for example Y, YUV420, YUV422, YUV444, RGB444, G and CMYK contemporary standards and formats. Moreover, the format is optionally planar, interleaved line planar and so forth. Moreover, the methods of the invention are beneficially operable to change format of images and/or blocks when performing encoding activities; for example, an original image is in an interleaved RGB format and is encoded using methods pursuant to the invention to generate encoded output data in YUV420 format or vice versa.

Bit depth, namely dynamic range of a pixel when implementing the aforesaid encoding method, is beneficially in a range of 1-bit to 64-bit resolution. Optionally, different pixel colours or audio channels can be encoding with mutually different resolutions, provided that encoding quality criteria and compression performance of the encoding methods is satisfied.

The encoding methods pursuant to the present invention are optionally implemented using encoding parameters and encoding rules and/or tables which are stored on a database and which are accessed when performing encoding activities. Optionally, the database is creating during the encoding process and delivered for use when implementing the method via an encoder. For example, motion compensation during encoding us beneficially implemented using delivered databases of information to the encoder. Beneficially, the encoder is operable to encode original pixel information present in the input data and/or encode prediction error information. Using database information when encoding input data to generate corresponding encoded output data enables the encoder to adapt to revisions in encoding standards of parameters, tables and similar utilized for encoding. Coding approaches which can be adopted when implementing the encoding methods pursuant to the present invention optionally include one or more of: data base reference, DC-value, DCT, pulse code modulation (PCM), DPCM, RLE, LZO, VLC, Huffman-coding, arithmetic coding, transform coding, delta coding, bzip2-specific RLE. Optionally, the coding approaches including any combination of aforementioned examples of coding. When a coding approach such as Huffman encoding is employed, such coding beneficially uses fixed tables of encoding parameters or delivered tables of coding parameters. The encoder is beneficially implemented using computing hardware having data storage arrangements, wherein optimized tables of encoding parameters can be stored in the data storage arrangements for future use when performing encoding operations. Beneficially, reference addresses for enabling a decoder to access databases for obtaining suitable parameters for decoding the encoded output data from the encoder are included in the encoded output data. Optionally, the databases are accessible via a communication network, for example via Internet. Optionally, the databases are supported via cloud computing arrangements. When the method implemented in the encoder utilizes mathematically generated databases, the databases can optionally be DC value, 1D/2D-linear transition, 1D/2D-curved transition, a 1D/2D transformation function or some known image block or audio packet structure.

The method of encoding pursuant to the present invention when executed on an encoder is operable to encode input data to generate encoded output data, wherein the encoded output data can be output as a bit stream, alternatively stored in data storage media, for example as a data file. Moreover, the method of the invention is capable of being utilized in a range of possible applications; beneficially, a header for video, image, image block, audio or audio packets beneficially includes supplementary information, such as version number, size of data for the video, image or packet, quality factor threshold employed when encoding, maximum block or packet size, encoding approaches applied, tables of encoding parameters, and any other information for assisting subsequent decoding processes. Optionally, information that does not vary between blocks is not included for obtaining an enhanced degree of data compression in the encoded output data, or is included at a higher level in the encoded output data, for example at header or sub-header level. Table 3 provides a hierarchical order of levels which are beneficially employed in the encoded output data generated by the encoder.

TABLE 3 order of levels in encoded output data, from high to low

| Level order | Information associated with level |
| --- | --- |
| High | video |
| | groups of images |
| | image |
| | groups of macro blocks |
| Medium | macro block |
| | groups of blocks |
| | block |
| | groups of microblocks |
| Low | microblock |

Optionally, the method of encoding pursuant to the present invention is operable when executed to select and to deliver information pertaining to one or more levels in the encoded output data, for example dependent upon field of application of the method, for example consumer video products, professional image compression apparatus for survey use, X-ray imaging apparatus, magnetic resonance imaging (MRA) apparatus. Similar considerations pertain to orders of levels in encoded output data when the method pursuant to the present invention is employed to encode audio data; there can be employed headers for audio, groups of packets, packets, sub-packets, groups of waveform segments, and waveform segment.

Referring to FIG. 1, there is shown an illustration of an encoder pursuant to the present invention. The encoder is denoted by 10 and is operable to receive input data 20 and to encode the input data 20 by employing an encoding method pursuant to the present invention to generate corresponding encoded compressed output data 30. The output data 30 is beneficially encoded in a substantially lossless manner as aforementioned. Optionally, the encoder 10 is coupled via a communication network 40 to a database arrangement 50 whereat one or more parameters, tables and/or rules for encoding the input are stored.

In operation, the encoder 10 receives the input data 20, optionally derives encoding information from the database arrangement 50 via the communication network 40, and then proceeds to encode the input data 20 to generate the encoded compressed output data 30. Optionally, the input data 20 includes at least one of: audio, one or more images, video. Optionally, the encoded output data 30 includes headers, encoding information as well as encoded data. The output data 30 can be streamed from the encoder 10, for example for communication via a communication network arrangement to one or more data storage devices or decoders, or stored directly onto machine-readable data storage media, for example server hard drive disk storage, portable solid-state memory devices and so forth.

The encoder 10 is beneficially implemented as hardware, for example via PGLA, via one or more software application executable upon computing hardware, or any mixture of hardware and software, for example a parallel processing engine. The encoder 10 can be employed in multimedia products, computers, mobile telephones ("cell phones"), Internet services, video recorders, video players, communication apparatus and similar. The encoder 10 is optionally employed in conjunction with image capture systems, for example surveillance cameras, hospital X-ray systems, hospital MRI scanners, hospital ultrasound scanners, aerial surveillance systems and similar apparatus which generate large quantities of image data wherein lossless compression is desired so as to preserve fine information in the images whilst rendering the quantities of image data manageable for data storage purposes.

The encoder 10 is beneficially useable with known apparatus for image processing, for example in conjunction with an image/video processor as described in a published US patent application no. US2007/280355 herewith incorporated by reference, for example in conjunction with an image generator as described in a published US patent application no. US2010/0322301 herewith incorporated by reference, and for example with a pattern recognizer as described in a published US patent application no. US2011/007971 herewith incorporated by reference.

Figure 2:
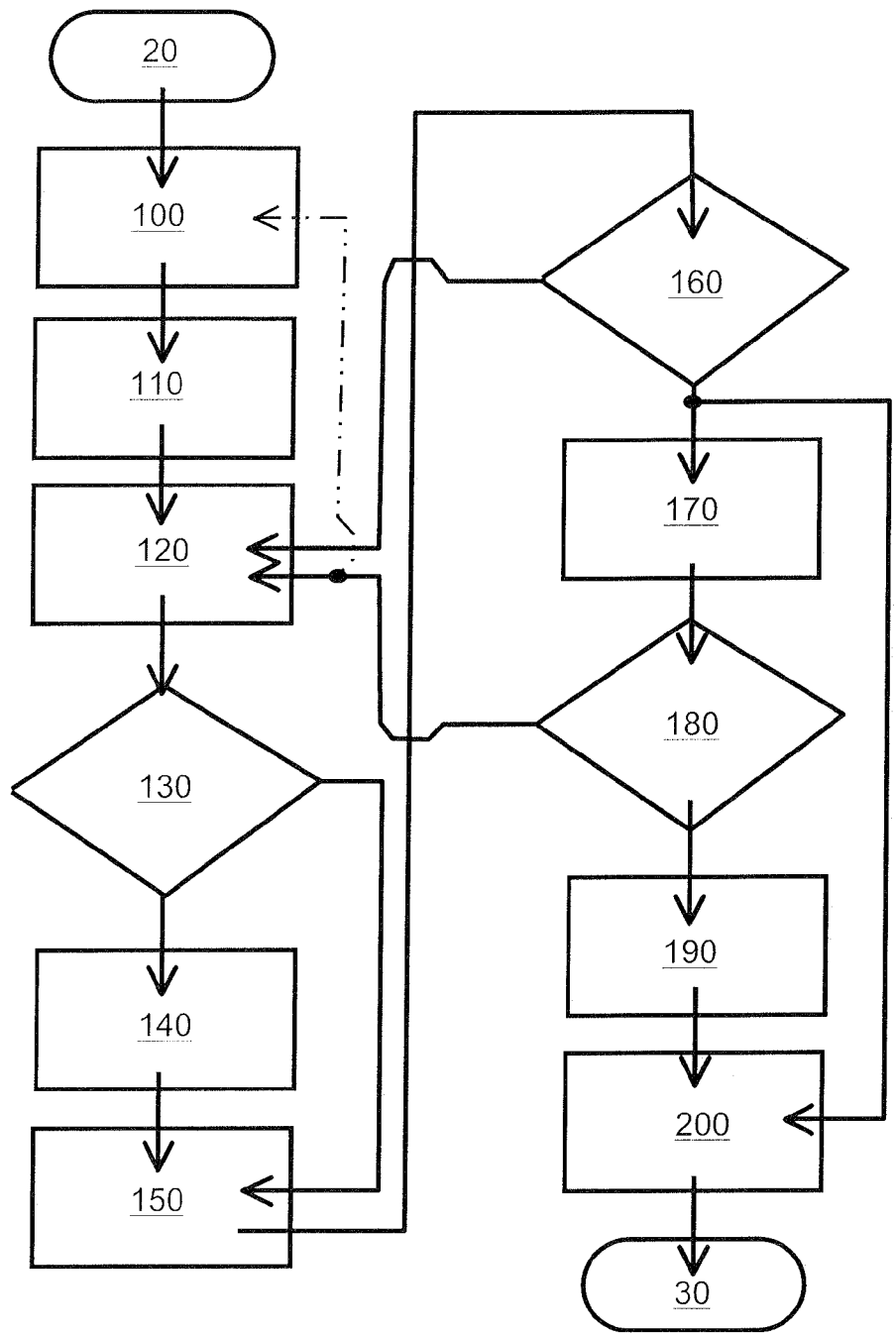
FIG. 2 is a flow chart of steps of a method of encoding input data representative of at least one image and/or audio to generate corresponding encoded output data, wherein the encoded output data is compressed relative to the input data without substantial loss of image quality occurring during encoding.

A method of encoding input data using the encoder 10 of FIG. 1 will now be described with reference to FIG. 2. In FIG. 2, steps of a method of encoding input data 20 are denoted by 100 to 200. In a first step 100, the method includes receiving input data for blocks, image, video and/or audio, for example for receiving the aforesaid input data 20; image/block type, image/block format information is derived at the first step for inclusion in the encoded output data 30. The first step 100 is capable of providing writing header information, for example image size information, into the encoded compressed data.

In a second step 110, executed after the first step 100, the method includes creating, if needed, initial blocks or packets. In a third step 120, executed after the second step 110, the method includes performing an analysis of block and/or packet information generated by the second step 110. In a fourth step 130, executed after the third step 120, the method includes determining whether or not one or more blocks and/or packets identified in the third step 120 need to be split, for example for achieving a defined quality of encoding, namely substantially lossless encoding; in an event that one or more blocks or packets are found to need splitting in the fourth step 130, the method proceeds to a fifth step 140 in which the one or more identified blocks or packets are split into smaller blocks or packets, thereby creating additional new blocks or new packets; in an event that one or more blocks or packets are not required to be split in the fourth step 130, the method proceeds to a sixth step 150. On completing the fifth step 140, when appropriate, the method proceeds to the sixth step 150.

At the seventh step 160, the method includes determining whether or not a last block or packet has been reached which is to be encoded; in an event that there are blocks or packets remaining to be encoded, the method includes returning back to the third step 120 of performing the analysis of block or packet information; in an event that all the blocks or packets have been encoded, the method includes proceeding to an eighth step 170. The eighth step 170 of the method includes compressing and encoding data, e.g. pixel values, parameters and split information, for example using RLE, Huffman, DCT or similar transformations, and writing header information as aforementioned; for example, if DC values of the blocks are sent, they can be firstly optionally delta-encoded, and thereafter corresponding delta-encoded values encoded as RLE and then these encoded using Huffman encoding. When compression and encoding activities in the eighth step 170 have been completed, the method includes proceeding to a ninth step 180 which is concerned with checking whether or not a last initial block, packet or frame has been reached; in an event that the last initial block, packet or frame has not been reached, the method includes returning to the third step 120; in an event that the last initial block, packet or frame has been reached, the method includes proceeding to a tenth step 190. In the tenth step 190, the method includes performing one or more analyses whether or not image/blocks are, for example, similar to previous image/blocks or, for example black in colour. Analysis might also need some information that can be got from the previous steps. This step enables image/block for the encoded output data 30 more compressed. Similar analysis that does not need any information from previous steps can also be done already in the third step 120, and then it is also possible to avoid unnecessary processing to be executed in the processor. After completing the tenth step 190, the method includes proceeding to an eleventh step 200, wherein the method includes applying end encoding of block, packet, image or video to finalize the encoded compressed output data 30. Optionally, the method includes progressing from the seventh step 160 directly to the eleventh step 200 if applicable, e.g. only one block in the image is needed to be encoded and it is e.g. black or similar than the previous block in the previous image. All the encoded data that can be written to the file or streamed out is beneficially made as early as possible to avoid extra buffering.

Figure 3:
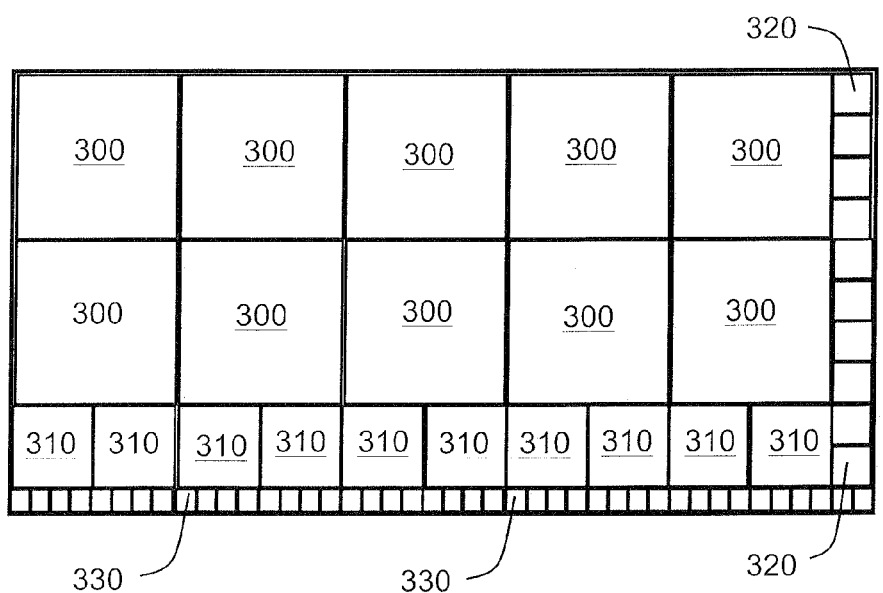
FIG. 3 is an example partitioning of an image into areas corresponding to blocks for encoding using a method whose steps are illustrated in FIG. 2.

Referring next to FIG. 3, from the foregoing, it will be appreciated that the method of encoding pursuant to the present invention employs, when appropriate, variable block or packet size for providing an optimal solution between data compression in the encoded output data 30 and substantially lossless compression, namely substantially without discernible loss. In FIG. 3, large coding blocks 300 are employed for an upper left hand corner of a given image, whereas smaller blocks 310, 320, 330 are required along right-hand-side and lower edge areas of the image for more accurately providing encoding of these areas. In the encoded output data 30, parameters describing image content of the blocks 300, 310, 320, 330 and the position of the blocks within the image are included in the encoded output data 30. The distribution of the blocks 300, 310, 320, 330 will vary depending upon spatial distribution of content within images to be encoded. The FIG. 3 shows example of the initial split of blocks in the image that is generated in the second step 110. This initial split of blocks does not require any information to be sent between encoder and decoder, because it can be based e.g. size of the image. According to embodiment when a real split of block is done in the fifth step 140 then that information may be delivered from the encoder to the decoder. A practical example on encoding an image is described later.

In the foregoing, the following abbreviations have been used as given in Table 4. These various encoding formats are all potentially relevant for use when implementing the encoder 10, depending upon desired performance of the encoder 10.

Referring again to FIG. 2, it will be appreciated that the method of encoding optionally completes encoding of at least one of images, video and audio, and then thereafter outputs the encoded output data 30. Alternatively, by way of a link after step 200 in FIG. 2 back to step 100 or 120, enables the encoded output data 30 to be output, for example streamed, concurrently with the method executing encoding steps on at least of images, video and audio. Such operation is beneficial when the method of the present invention is employed to encode source data at a server site in real time for streaming to customers, for example for Internet-delivered multimedia services. The method is potentially thereby capable of functioning with small data storage capacity available, and user interruption of streamed encoded data, for example by the user selecting an alternative, avoids an entire video file being encoded when not required by the user, thereby saving computer processing resources. Such considerations are very important for contemporary multimedia streaming services operating via Internet for example.

When sending the encoded output data 30, for example in a concurrent encoding/streaming situation as aforementioned, it is beneficial that highest level headers are sent first and thereafter encoded data related to a highest level of hierarchy, whereafter encoded data relating to lower levels are hierarchy are sent. For example, in the encoded output data 30, image size data and image/video related data are send first in the encoded output data 30, and thereafter information relating to splitting of blocks, and thereafter algorithms utilized in block encoding and encoded block data.

The encoder 10 is beneficially implemented using computing hardware including a parallel processor architecture including a plurality of processors organized to process data in parallel. For example, on account of initial block splitting to provided the split blocks 300, 310, 320, 330, the split blocks 300, 310, 320, 330 can be distributed the plurality of processors, for example a first processor encoding the blocks 300, 310, 320 and a second processor encoding the blocks 330.

During encoding, the number of channels employed by the encoder 10 to encode images, video and/or audio can be dynamically variable, for obtaining a greater degree of data compression in the encoded output data 30. For example, it is convenient to employ up to four channels, although images can include multiple layers that can be presented together. The layers optionally pertain to one or more of: subtitles, logos, multi-view images, depth. Moreover, the layers optionally convey mutually different volumes of data. All associated layer data are encoded in the encoded output data 30 as separate channels, and an associated description regarding how the channels should be combined and used is also included in one or more headers included in the encoded output data 30.

TABLE 4

Abbreviations for encoding transformations useable when implementing embodiments of the present invention

| | |
|---|---|
| 1D | 1-Dimensional (e.g. for a signal or packet) |
| 2D | 2-Dimensional (e.g. for a block, image, stereo or multichannel audio |
| 3D | 3-Dimensional (e.g. for video, stereo image, multichannel image) |
| AAC | Advanced Audio Coding |
| AVC | Advanced Video Coding |
| BMP | Bitmap - file format |
| DC | Direct current |
| DCT | Discrete cosine transform |
| DPCM | Differential Pulse Code Modulation |
| FLAC | Free Lossless Audio Codec |
| GIF | Graphic Interchange Format |
| JPEG | Joint Photographic Experts Group |
| JPEG XR | JPEG eXtended Range |
| LZO | Lempel-Ziv transform based coding method |
| MAD | Mean Absolute Difference |
| MP3 | MPEG-1 Audio Layer 3 |
| MPEG | Motion Picture Experts Group |
| MSD | Mean Square Difference |
| MVC | Multiview Video Encoding |
| PCM | Pulse Code Modulation |
| PNG | Portable Network Graphics |
| RLE | Run-Length Encoding |
| SAD | Sum of Absolute Differences |
| SSD | Sum of Square Differences |
| TIFF | Tagged Image File Format |
| VLC | Variable Length Coding |
| VQ | Vector Quantization |

It will be appreciated that the splitting of blocks illustrated in FIG. 3 is merely an example. In a temporal sequence of images, for example a video sequence, objects depicted in the images with well-defined edges often are found to move about within a given field of view of the images, resulting in the splitting of blocks following movements of the objects. In still images the splitting of blocks typically creates the result that follows the edges in the spatial image. When the splitting of blocks is illustrated from the still image the objects can often be detected from it.

The method of encoding pursuant to the invention, for example as depicted in FIG. 2, is capable, via layer and channel encoding executed in the encoder 10, capable of supporting interactive video presentations for providing new types of content delivery services, for example interactive commercial advertisements, different viewing perspectives when streaming live sports activities such as Formula 1 and so forth, and movies. For example, the encoder 10 allows for movies with localized subtitle layers, interactive watermarks, interactive pattern recognition, animated 2D/3D user interface (UI) buttons and so forth.

Figure 4:
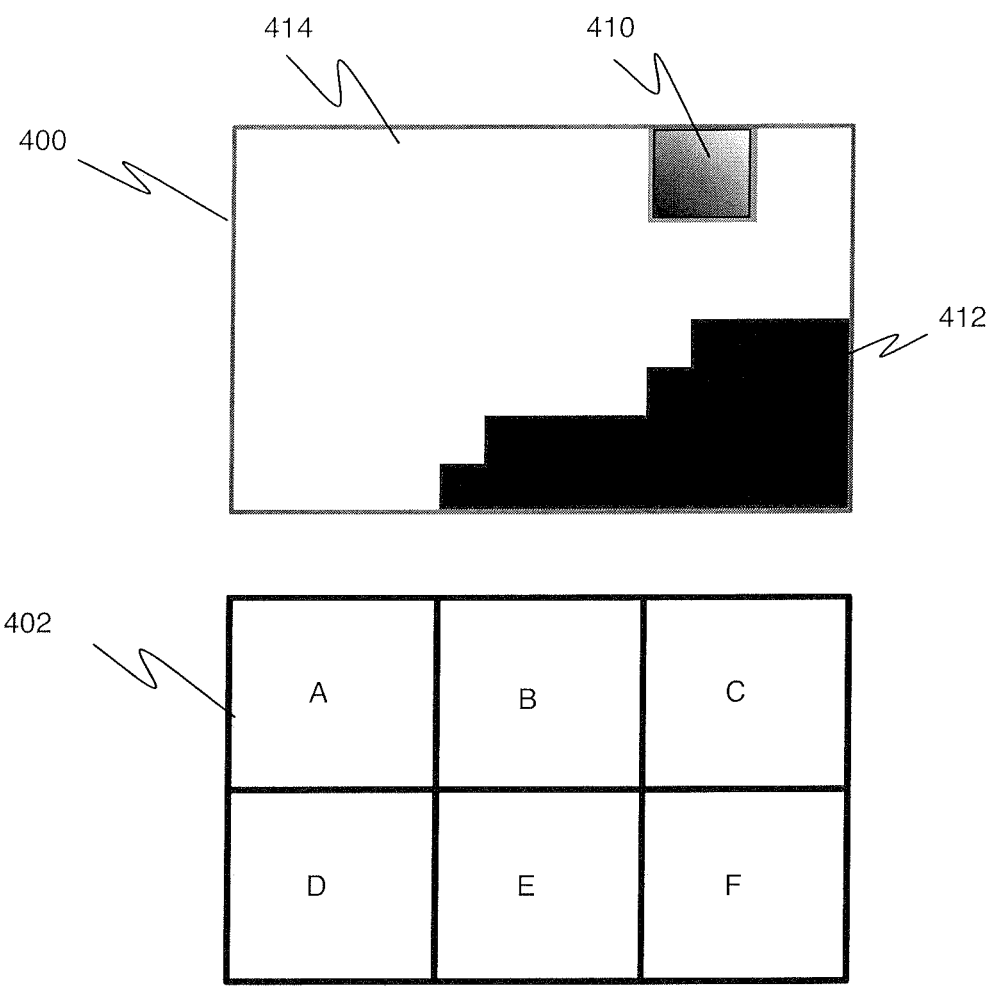
FIG. 4 is an example image and example initial image split to be use according to embodiments.
Figure 5:
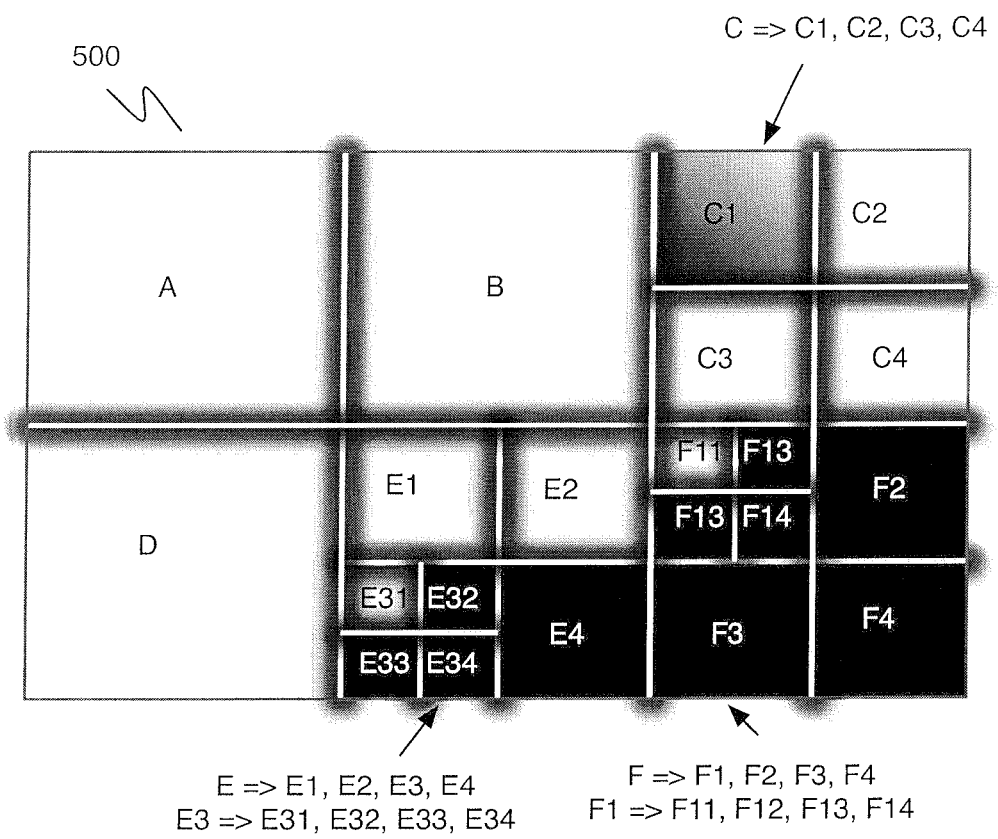
FIG. 5 is an example blocks of the example image of FIG. 4.

Simplified example of an embodiment of encoding is shown in FIG. 4. Image 400 to be encoded has flat blue area 414 (shown as white in the figure for clarity), green area 412 (shown as black in the figure for clarity) and sliding red area 410 (shown as sliding grey in the figure for clarity). The size of image can be arbitrary for example 12×8 or 24×16 or 120×80 etc pixels. The initial block sizes 402 for the image are selected as 4×4 or 8×8 or 40×40 etc respectively for different image sizes. In embodiment there are six blocks A, B, C, D, E and F. According to embodiment first block A is analysed. Block A is found out to be uniform and consisting of only blue (with colour value represented by number 10). Block A is considered as one area. Block B is analysed next. The block B consists also of only blue therefore it is considered as one area. Block C is analysed next. Block C is not uniform therefore it is split to four sub blocks of C1, C2, C3 and C4. First sub block C1 is analysed. It consists sliding red area (with colour value of 15 in lower left corner, values of 20 in top left and bottom right corner and value of 25 in top right corner. Sub block C1 is considered as one area. Sub block C2, C3 and C4 are analysed respectively. C2, C3 and C4 consist flat blue and are each marked as flat blue areas. Block D is analysed next. Block D has only one colour, flat blue, and is considered as one area. Block E is analysed next. Block E is not uniform and it is split to four sub blocks of E1, E2, E3 and E4. Sub blocks E1 and E2 are both uniform with colour of flat blue. Sub block E3 is not uniform and it is split further to four sub blocks E31, E32, E33 and E34. Each sub block is analysed. E31 is found out to consist of uniform colour of blue and is marked as flat blue area. E32, E33 and E34 are found out to be green (with colour value of 5 as an example) and are designated to be green. Sub block E4 is analysed and found out to be uniform and designated as colour green. Block F is analysed and found out not to be uniform. The block F is split to four sub blocks F1, F2, F3 and F4. Sub block F1 is analysed and found out not to be uniform. The sub block F1 is split further to sub blocks F11, F12, F13 and F14. Each sub block is analysed. Sub block F11 is found out to be uniform with colour blue. Sub blocks F12, F13 and F14 are found out to be uniform with colour green. Values are associates with blocks respectively. Sub blocks F2, F3 and F4 are further analysed and found out to be uniform with color green. Values are associated with blocks respectively.

An example way to code said encoding process is to give value "0" for a block which is not split and value "1" for a block which needs to be split. Using said logic above example can be coded as (referred as Split Bits)

0 0 1 0000 0 1 0010 0000 1 1000 0000, where first two "0" illustrate that the initial blocks (of A, B) are not split, third block C is split "1" but the sub blocks are not split, fourth block D is not split, fifth block E is split, first two sub blocks (E1, E2) are not split but sub block E3 is split etc. Said string can further be for example run length coded.

Further "fill" method for each block can be coded for example with logic of "0" for assigning flat colour for the block and "1" for assigning sliding colour for the block (referred as Method Bits)

0 0 1 0 0 0 0 0 0 0 0 0 0 0 0 0 0 0 0 0 0

In the code first two blocks A and B are flat color, next block C1 is sliding and all rest are flat colour. Said string can further be for example run length coded.

Color values respectively for the blocks are (referred as Values)

10 10 20 25 15 20 10 10 10 10 10 10 5 10 5 5 5 5 5 5 10 5 5 5

Where set "20, 25, 15, 20" is describing colour values of each corner of C1. Said string can be for example Huffman coded to reduce size. Further since block group E31, E32, E33 and E34 and block group F11, F12, F13 and F14 have same colour values combination and order (10, 5, 5, 5) it can be considered as one element and designed with own value (referred as Combination Value). Said combination value can be stored in a database (of encoder or decoder) and called with Reference Identification number when needed.

According to embodiments Split Bits, Method Bits, Values and Combination Values can be stored in encoder hardware as result of encoding or those can be sent to other hardware for decoding purposes.

Figure 6:
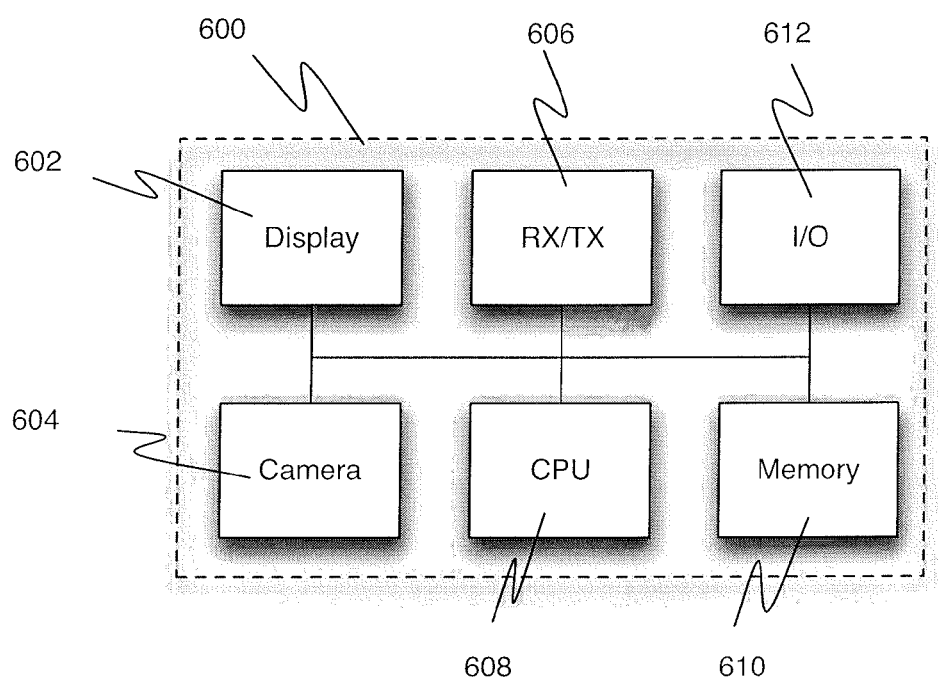
FIG. 6 illustrates blocks of portable device in which encoding could be implemented.

In one embodiment the encoding can be implemented in portable device 600 of FIG. 6 such as smart phone or digital camera or video camera. Portable device 600 can consist of camera 604 for capturing image, display for showing the image, receiver transmitter (RX/TX) 606 to enable communication using cellular networks or local area networks, other Input/Ouput (I/O) 612 such as Universal Serial Bus (USB) or Ethernet, Central Processing Unit (CPU) 608 for executing encoder related algorithms and instructions and memory 610 for storing image from camera, software for the encoder and encoded image content. The portable device 600 can be configured to store encoded images in local memory 610 or it can be configured to send periodically, upon request, upon user action or in real time or close to real time encoded images via RX/TX 606 or via I/O 612 to external systems.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. A method of encoding input data to generate corresponding encoded output data in a codec, the method comprising the steps of:
   (a) sub-dividing the input data into a plurality of blocks or packets, the blocks or packets having a size depending upon a nature of their content, and the blocks or packets being of one or more sizes;
   (b) applying a plurality of different types of transformations to content of the blocks or packets to generate corresponding transformed data;
   (c) checking a quality of representation of the transformed data of the blocks or packets compared to the content of the blocks or packets prior to application of the plurality of transformations to determine whether or not the quality of representation of the transformed data satisfies one or more quality criteria;
   (d) in an event that the quality of representation of the transformed data of the one or more blocks or packets does not satisfy the one or more quality criteria, sub-dividing and/or combining the one or more blocks or packets further and repeating step (b) before performing encoding; and
   (e) in an event that the quality of representation of the transformed data of the one or more blocks or packets satisfies the one or more quality criteria, outputting the transformed data to provide the encoded output data representative of the input data to be encoded.

2. The method as recited in claim 1, wherein the method further comprises at least one of: using the plurality of transformations to compress content associated with the blocks or packets, so that the encoded output data is smaller in size than the input data to be encoded, and the plurality of transformations are provided in the encoded output data.

3. The method as recited in claim 1, wherein the method further comprises arranging for the one or more quality criteria to be dynamically variable during encoding of the blocks or packets depending upon a nature of content included within the blocks or packets.

4. The method as recited in claim 1, further comprising sub-dividing and/or combining the blocks or packets so that at least one of their representative parameters describing their content is substantially flat within their sub-divided and/or combined blocks or packets.

5. The method as recited in claim 1, wherein the blocks or packets correspond to a series of data, wherein sub-division of the input data corresponding to a given information to form the plurality of corresponding blocks is made dependent upon content present in one or more data preceding the given information within the temporal sequence of data.

6. The method as recited in claim 1, wherein the method further comprises adding header information to the transformed data in step (e) to generate the encoded output data, wherein the header information includes information indicative of the plurality of transformations employed in step (b).

7. The method as recited in claim 1, wherein step (b) further comprises fetching supplementary information from a database arrangement for use when executing said plurality of transformations, wherein the supplementary information comprises at least one of: algorithms, rules, and one or more transformation parameters.

8. The method as recited in claim 7, wherein the method further comprises adding header information to the encoded output data indicative of the database arrangement for enabling subsequent decoding of the encoded output data to access the supplementary information when decoding the encoded output data.

9. The method as recited in claim 1, wherein the method further comprises employing for the plurality of transformations at least two of: a data base reference, a DC-value, a Discrete Cosine Transform (DCT), pulse code modulation (PCM), Differential Pulse Code Modulation (DPCM), Run-Length Encoding (RLE), a Lempel-Ziv-Oberhumer (LZO), Variable Length Coding (VLC), Huffman-coding, arithmetic coding, range coding, transform coding, delta coding and bzip2-specific RLE.

10. The method as recited in claim 1, wherein the method further comprises encoding at least one of video, image, and audio, information present in the input data.

11. The method as recited in claim 1, wherein the method further comprises encoding multiple channels and/or layers in the encoded output data for providing at least one of: interactive video, commercial advertisements, a plurality of viewpoints during sports event reporting, interactive watermarks, interactive pattern recognition, and animated 2D/3D user interface buttons.

12. A software product recorded on non-transitory machine-readable data storage media, wherein the software product is executable with computing hardware for executing the method as recited in claim 1.

13. A non-transitory computer readable memory to tangibly store a software application for a mobile wireless communication device, wherein the software application comprises the software product as recited in claim 12.

14. An encoder operable to encode input data to generate corresponding encoded output data, wherein the encoder comprises data processing hardware which is operable:
(a) to sub-divide the input data into a plurality of blocks or packets, the blocks or packets having a size depending upon a nature of their content, and the blocks or packets being of one or more sizes;
(b) to apply a plurality of different types of transformations to content of the blocks or packets to generate corresponding transformed data;
(c) to check a quality of representation of the transformed data of the blocks or packets compared to the content of the blocks or packets prior to application of the plurality of transformations to determine whether or not the quality of representation of the transformed data satisfies one or more quality criteria;
(d) in an event that the quality of representation of the transformed data of the one or more blocks or packets does not satisfy the one or more quality criteria, sub-dividing and/or combining the one or more blocks or packets further and repeating step (b) before performing encoding; and
(e) in an event that the quality of representation of the transformed data of the one or more blocks or packets satisfies the one or more quality criteria, to output the transformed data to provide the encoded output data representative of the input data to be encoded.

15. The encoder as recited in claim 14, wherein at least one of: the data processing hardware is implemented using computing hardware operable to execute a software product, and the plurality of transformations are provided in the encoded output data from the encoder.

16. The encoder as recited in claim 15, wherein the data processing hardware includes a plurality of processors which are operable to process data in parallel, and the encoder is operable to direct concurrently block and/or packet data to the plurality of processors for encoding to data to be included in the encoded output data.

17. The encoder as recited in claim 14, wherein the encoder is operable to use the plurality of transformations to compress content associated with the blocks or packets, so that the encoded output data is smaller in size than the input data to be encoded.

18. The encoder as recited in claim 14, wherein the encoder is operable to arrange for the one or more quality criteria to be dynamically variable during encoding of the blocks or packets depending upon a nature of content included within the blocks or packets.

19. The encoder as recited in claim 14, wherein at least one of the blocks or packets are sub-divided and/or combined so that at least one of their representative parameters describing their content is substantially flat within their sub-divided and/or combined blocks or packets.

20. The encoder as recited in claim 19, wherein the at least one parameter corresponds to a colour of the sub-divided blocks.

21. The encoder as recited in claim 14, wherein the blocks or packets correspond to a series of data wherein sub-division of the input data corresponding to a given information to form the plurality of corresponding blocks is made dependent upon content present in one or more data preceding the given information within the temporal sequence of data.

22. The encoder as recited in claim 14, wherein the encoder is operable to add header information to the transformed data to generate the encoded output data, wherein the header information includes information indicative of the plurality of transformations employed by the encoder.

23. The encoder as recited in claim 14, wherein the encoder is operable to fetch supplementary information from a database arrangement for use when executing said plurality of transformations, said supplementary information including at least one of: algorithms, rules, and one or more transformation parameters.

24. The encoder as recited in claim 23, wherein the encoder is operable to add header information to the encoded output data in a manner indicative of the database arrangement for enabling subsequent decoding of the encoded output data to access the supplementary information when decoding the encoded output data.

25. The encoder as recited in claim 14, wherein the encoder is operable to employ for the plurality of transformations at least two of: a data base reference, a DC-value, DCT, pulse code modulation (PCM), Differential Pulse Code Modulation (DPCM), Run-Length Encoding (RLE), Lempel-Ziv-Oberhumer (LZO), Variable Length Coding (VLC), Huffman-coding, arithmetic coding, range coding, transform coding, delta coding, and bzip2-specific RLE.

26. The encoder as recited in claim 14, wherein the encoder is operable to encode at least one of video, image, audio, information present in the input data.

27. The method as recited in claim 1, further comprising the step utilizing a single processing unit.

* * * * *